(12) United States Patent
Takahashi et al.

(10) Patent No.: US 6,642,340 B1
(45) Date of Patent: Nov. 4, 2003

(54) PROCESS FOR PREPARING AN ETHYLENE/α-OLEFIN COPOLYMER

(75) Inventors: Mamoru Takahashi, Waki-cho (JP); Takasi Nakagawa, Wako-cho (JP); Masaaki Ohgizawa, Waki-cho (JP)

(73) Assignee: Mitsui Chemicals, Inc., Tokyo (JP)

( * ) Notice: Subject to any disclaimer, the term of this patent is extended or adjusted under 35 U.S.C. 154(b) by 461 days.

(21) Appl. No.: 09/609,119

(22) Filed: Jun. 30, 2000

Related U.S. Application Data

(60) Continuation of application No. 09/023,717, filed on Feb. 13, 1998, now abandoned, which is a division of application No. 08/771,988, filed on Dec. 23, 1996, now abandoned.

(30) Foreign Application Priority Data

Dec. 28, 1995 (JP) .............................. 7-344104

(51) Int. Cl.⁷ .............................. C08F 10/14; C08F 4/42
(52) U.S. Cl. .................... 526/348.2; 526/160; 526/943; 526/129; 526/348; 526/342; 526/124.1; 502/103; 502/132; 502/152; 502/104; 502/87
(58) Field of Search .................... 526/160, 943, 526/129, 348, 342, 124.1, 348.2; 502/103, 132, 152, 104, 87

(56) References Cited

U.S. PATENT DOCUMENTS

| | | | |
|---|---|---|---|
| 5,281,679 A | | 1/1994 | Jejelowo et al. |
| 5,296,565 A | * | 3/1994 | Ueda et al. .................. 526/114 |
| 5,371,146 A | | 12/1994 | Takahashi et al. |
| 5,455,316 A | * | 10/1995 | Tsutsui et al. ................ 526/114 |
| 5,459,217 A | * | 10/1995 | Todo et al. ................. 526/348.1 |
| 5,464,905 A | * | 11/1995 | Tsutsui et al. ............... 525/240 |
| 5,466,649 A | * | 11/1995 | Jejelowo ..................... 502/120 |

FOREIGN PATENT DOCUMENTS

| | | |
|---|---|---|
| CA | 2162681 | 11/1994 |
| CA | 2130502 | 2/1995 |
| EP | 575123 | 12/1993 |
| EP | 0605952 | 7/1994 |
| JP | 6136060 | 5/1994 |
| JP | 08-059746 | 5/1996 |

OTHER PUBLICATIONS

Database WPI, Section Ch, Week 9619, Derwent Publications Ltd., London, GB; & JP 08 059 746 A (Asahi Kasei Kogyo KK), Mar. 5, 1996.

* cited by examiner

*Primary Examiner*—Ling-Siu Choi
(74) *Attorney, Agent, or Firm*—Burns, Doane, Swecker & Mathis, LLP

(57) ABSTRACT

A process for preparing an ethylene/α-olefin copolymer, which includes the steps of (A) copolymerizing ethylene and an α-olefin of 3 to 20 carbon atoms by continuous vapor phase polymerization; (B) copolymerization is conducted in the presence of a prepolymerized catalyst obtained by prepolymerizing an olefin in the presence of (a) a transition metal compound, (b) an organoaluminum oxy-compound, (c) a fine particle carrier, and optionally (d) an organoaluminum compound; and (C) copolymerization is conducted under such condition that the partial pressure of sum total of ethylene and α-olefin is 10 to 28 kg/cm². The resulting ethylene/α-olefin copolymer has the following properties: (i) the density is in the range of 0.880 to 0.960 g/cm³, (ii) the melt flow rate of 190° C. under a load of 2.16 kg is in the range of 0.1 to 100 g/10 min, (iii) the melt tension (MT (g)) at 190° C. and the melt flow rate (MFR (g/10 min)) satisfy the relation $MT \leq 2.2 \times MFR^{-0.84}$.

19 Claims, No Drawings

PROCESS FOR PREPARING AN ETHYLENE/α-OLEFIN COPOLYMER

This is a continuation of application Ser. No. 09/023,717 filed Feb. 13, 1998 which is a division of application Ser. No. 08/771,988 filed Dec. 23, 1996, both of which are now abandoned, application Ser. No. 09/023,717 is incorporated herein in its entirety by reference thereto.

FIELD OF THE INVENTION

The present invention relates to ethylene/α-olefin copolymers and films obtained from the copolymers. More particularly, the invention relates to ethylene/α-olefin copolymers having excellent moldability, transparency and mechanical strength and also relates to films obtained from the copolymers.

BACKGROUND OF THE INVENTION

Ethylene copolymers such as ethylene/α-olefin copolymers have been molded by various molding methods, and they have been employed in various fields. The ethylene copolymers are generally prepared by the use of Ziegler catalysts.

In general, the ethylene polymers obtained by the use of titanium catalysts among the Ziegler catalysts have excellent moldability because of their wide molecular weight distribution and wide composition distribution, but their molded products such as films have a problem of surface tackiness.

Meanwhile, it is known that the ethylene polymers obtained by the use of metallocene catalysts among the Ziegler catalysts generally have narrow composition distribution and their molded products such as films have an advantage of low surface tackiness. However, because of narrow molecular weight distribution, these polymers are inferior in the moldability to the ethylene polymers obtained by the use of the titanium catalysts. In the prior art, therefore, the ethylene polymers obtained by one use of the metallocene catalysts have been blended with other polymers to improve the moldability.

Under such circumstances as mentioned above, the present inventors have earnestly studied. As a result, they have found that an ethylene/α-olefin copolymer having the following properties shows excellent moldability though this copolymer is obtained by the use of a metallocene catalyst, and also found that this copolymer has excellent film properties. That is, the ethylene/α-olefin copolymer has the properties: the density and the melt flow rate are each in the specific range; the melt tension and the melt flow rate satisfy the specific relation; the flow index and the melt flow rate satisfy the specific relation; the quantity fraction of a decane-soluble component of the copolymer and the density satisfy the specific relation; the temperature at the position of the maximum peak of an endotherm curve of the copolymer measured by a differential scanning a calorimeter and the density satisfy the specific relation; the endotherm curve of the copolymer measured by a differential scanning calorimeter has two or more melting point peaks, and the temperature at the position of the peak on the lowest temperature side, the temperature at the position of the maximum peak and the density satisfy the specific relation; and a component which is eluted at a temperature or not lower than 100° C. in a temperature rise elution test (TREF) exists in the copolymer, and the amount of the eluted component is in the specific range. Based on the finding, the present invention has been accomplished.

OBJECT OF THE INVENTION

It is an object of the present invention to provide an ethylene/α-olefin copolymer showing excellent moldability and capable of producing molded products of excellent transparency and mechanical strength and to provide a film obtained from the copolymer.

SUMMARY OF THE INVENTION

The ethylene/α-olefin copolymer according to the invention is a copolymer of ethylene and an α-olefin of 3 to 20 carbon atoms and has the following properties;

(i) the density is in the range of 0.850 to 0.960 g/cm$^3$, (ii) the melt flow rate at 190° C. under a load of 2.16 kg is in the range of 0.1 to 100 g/10 min, (iii) the melt tension (MT (g)) at 190° C. and the melt flow rate (MFR (g/10 min)) satisfy the relation $$MT \leq 2.2 \times MFR^{-0.84}$$

(iv) the quantity fraction (W (% by weight)) of a decane-soluble component of said copolymer at 23° C. and the density (d (g/cm$^3$)) satisfy the relation
in the case of MFR≤10 g/10 min:

$$W < 80 \times \exp(-100(d-0.88)) + 0.1,$$

in the case of MFR>10 g/10 min:

$$W < 80 \times (MFR^{-9})^{0.26} \times \exp(-100(d-0.88)) + 0.1,$$

(v) the temperature (Tm (° C.)) at the position of the maximum peak of an endotherm curve of said copolymer measured by a differential scanning calorimeter and the density (d (g/cm$^3$)) satisfy the relation $$Tm < 400 \times d - 248,$$

(vi) the endotherm curve of said copolymer measured by a differential scanning calorimeter has two or more peaks, and the temperature (Tm$_1$ (° C.)) at the position of the peak on the lowest temperature side, the temperature (Tm (° C.)) at the position of the max mum peak and the density (d (g/cm$^3$)) satisfy the relation $$576 - 600d > (Tm - Tm_1) > 558 - 600d,$$

and (vii) a component, which is eluted at a temperature of not lower than 100° C. in a temperature rising elution fractionation test (TREF), exists in said copolymer, and the amount of the eluted component is not more than 10% of the total amount of the eluate.

When the ethylene/α-olefin copolymer is cast molded into a film, the resulting film generally has the following properties:
the film impact strength: (FIS (J/m)) and the density (d (g/cm$^3$)) satisfy the relation $$\log(FIS) > (-50.17 \times d) - 47.55.$$

The ethylene/α-olefin copolymer of the invention has excellent moldability, and from the copolymer, molded products having excellent transparency and mechanical strength can be obtained.

The film according to the invention is obtained from the above-described ethylene/α-olefin copolymer.

The cast film according to the invention is obtained by cast molding the ethylene/α-olefin copolymer and has the following properties:
the film impact strength (FIS (J/m)) and the density (d (g/cm$^3$)) satisfy the relation $$\log(FIS) > (-50.17 \times d) + 47.55.$$

The film of the invention is excellent not only in mechanical strength, such as impact strength, tear strength and elastic modulus, but also in transparency.

DETAILED DESCRIPTION OF THE INVENTION

The ethylene/α-olefin copolymer according to the invention and the film obtained from the copolymer are described in detail hereinafter.

The ethylene/α-olefin copolymer of the invention is a random copolymer of ethylene and an α-olefin of 3 to 20 carbon atoms.

In the ethylene/α-olefin copolymer, the constituent units derived from ethylene are desirably contained in amounts of 65 to 99% by weight, preferably 70 to 98% by weight, more preferably 75 to 96% by weight, and the constituent units derived from the α-olefin of 3 to 20 carbon atoms are desirably contained in amounts of 1 to 35 % by weight, preferably 2 to 30% by weight, more preferably 4 to 25% by weight.

Examples of the α-olefins of 3 to 20 carbon atoms include propylene, 1-butene, 1-pentene, 1-hexane, 4-methyl-1-pentene, 1-octene, 1-decene, 1-dodecene, 1-tetradecene, 1-hexadecene, 1-octadecene and 1-eicosene.

The ethylene/α-olefin copolymer has a density of 0.880 to 0.960 g/cm$^3$, preferably 0.885 to 0.940 g/cm$^3$, more preferably 0.890 to 0.935 g/cm$^3$.

The ethylene/α-olefin copolymer has a melt flow rate, as measured at 190° C. under a load of 2.16 kg, of 0.1 to 100 g/10 min, preferably 0.3 to 50 g/10 min, more preferably 0.5 to 20 g/10 min.

In the ethylene/α-olefin copolymer, the melt tension (MT (g)) at 190° C. and the melt flow rate (MFR (g/10 min)) satisfy the relation $$MT < 2.2 \times MFR^{-0.84},$$

In the ethylene/α-olefin copolymer, further, the quantity fraction (W (% by weight)) of its n-decane-soluble component at 23° C. and the density (d (g/cm$^3$)) satisfy the relation in the case of MFR≦10 g/10 min:

$$W < 80 \times \exp(-100(d-0.88)) + 0.1,$$

preferably $W < 60 \times \exp(-100(d-0.88)) + 0.1$,
more preferably $W < 40 \times \exp(-100(d-0.88)) + 0.1$,
in the case of MFR>10 g/10 min:

$$W < 80 \times (MFR-9)^{0.26} \times \exp(-100(d-0.88)) + 0.1.$$

It can be said that the ethylene/α-olefin copolymer having the above properties shows a narrow composition distribution.

In the ethylene/(α-olefin copolymer, the temperature (Tm (° C.)) at the position of the maximum peak of its endotherm curve measured by a differential scanning calorimeter and the density (d (g/cm$^3$)) satisfy the relation $$Tm < 400 \times d - 248,$$

preferably $Tm < 450 \times d - 296$,
more preferably $Tm < 500 \times d - 343$,
particularly preferably $Tm < 550 \times d - 392$.

Because of low Tm for its density, the ethylene/α-olefin copolymer shows better heat sealability as compared with an ethylene/α-olefin copolymer having the same density.

In the endotherm curve of the ethylene/α-olefin copolymer measured by a differential scanning calorimeter (DSC), there are two or more peaks, and the temperature ($Tm_1$ (° C.)) at the position of the peak on the lowest temperature side, the temperature (Tm (° C.)) at the position of the maximum peak and the density (d (g/cm$^3$)) satisfy the relation $$576 - 600d > (Tm - Tm_1) > 558 - 600d.$$

The ethylens/α-olefin copolymer, which has such properties that is endotherm curve measured by DSC has two or more peaks and that the temperature ($Tm_1$ (° C.)) at the position of the peak on the lowest temperature side, the temperature (Tm (° C.)) at the position of the maximum peak and the density (d (g/cm$^3$)) satisfy the above relation, shows a low starting temperature of heat sealing and good hot tack when it is molded into a film.

In the ethylene/α-olefin copolymer, a component which is eluted at a temperature or not lower than 100° C. in a temperature rising elution fractionation test (TREF) exists, and the amount of the eluted component is not more than 10%, preferably 0.5 to 8%, more preferably 1 to 5%, of the total amount of the eluate.

From the ethylene/α-olefin copolymer wherein a component which is eluted at a temperature of not lower than 100° C. in the measurement or TREF exists and the amount of said component is in the above range, a film having excellent tear strength, high elastic modulus and high nerve can be obtained.

When the ethylene/α-olefin copolymer is cast molded into a film, the resulting film generally has the following properties:

the film impact strength (FIS (J/m)) and the density (d (g/cm$^2$)) satisfy the relation $$\log(FIS) > (-50.17 \times d) + 47.55.$$

The ethylene/α-olefin copolymer can be prepared by, for example, copolymerizing ethylene and an α-olefin of 3 to 20 carbon atoms in a gas phase under the later-described specific condition in the presence of an olefin polymerization catalyst formed from:

(a) the later-described transition metal compound,
(b) an organoaluminum oxy-compound,
(c) a fine particle carrier,
and optionally
(d) an organoaluminum compound, in such a manner that the resulting copolymer has a density of 0.880 to 0.960 g/cm$^3$.

The olefin polymerization catalyst and the catalyst components are described below.

The transition metal compound (a) (sometimes referred to as "component (a)" hereinafter) used for preparing the ethylene/α-olefin copolymer is a transition metal compound represented by the following formula (I).

$$ML_x \quad (I)$$

In the formula (I), M is a transition metal atom selected from Group IVB of the periodic table, specifically, zirconium, titanium or hafnium, preferably zirconium.

x is a valence of the transition metal atom M and represents the number of L coordinated to the transition metal atom.

L is a ligand coordinated to the transition metal atom M, and at least two of the ligands L are each a cyclopentadienyl group, a methylcyclopentadienyl group, an ethylcyclopentadienyl group or a substituted cylcopentadienyl group having at least one substituent selected from hydrocarbon groups of 3 to 10 carbon atoms. The ligand L other than the (substituted) cyclopentadienyl group is a hydrocarbon group of 1 to 12 carbon atoms, an alkoxy group, an aryloxy group, a halogen atom, a trialkylsilyl group or a hydrogen atom.

The substituted cyclopentadienyl group may have two or more substituents, and the two or more substituents may be the same or different from each other. When the substituted cyclopentadienyl group hare two or more substituents, at least one substituent is a hydrocarbon group of 3 to 10 carbon atoms, and other substituents may be each methyl, ethyl or a hydrocarbon group of 3 to 10 carbon atoms. The substituted cyclopentadienyl groups coordinated to M may be the same as or different from each other.

Examples of the hydrocarbon groups of 3 to 10 carbon atoms include alkyl groups, cycloalkyl groups, aryl groups and aralkyl groups. More specifically, there can be mentioned alkyl groups, such as n-propyl, isopropyl, n-butyl, isobutyl, sec-butyl, t-butyl, pentyl, hexyl, octyl-2-ethylhexyl and decyl; cycloalkyl groups, such as cyclopentyl and cyclohexyl; aryl groups, such as phenyl and tolyl; and aralkyl groups, such as benzyl and neophyl.

Of these, preferable are alkyl groups, and particularly preferable are n-propyl and n-butyl.

In the present invention, the (substituted) cyclopentadienyl group coordinated to the transition metal is preferably a substituted cyclopentadienyl group, more preferably a cyclopentadienyl group substituted with an alkyl group of 3 or more carbon atoms, still more preferably a di-substituted cyclopentadienyl group, particularly preferably a 1,3-substituted cyclopentadienyl group.

In the formula (I), the ligand L other than the (substituted) cyclopentadienyl group coordinated to the transition metal atom M is a hydrocarbon group of 1 to 12 carbon atoms, an alkoxy group, an aryloxy group, a halogen atom, a trialkylsilyl group or a hydrogen atom.

Examples of the hydrocarbon groups of 1 to 12 carbon atoms include alkyl groups, cycloalkyl groups, aryl groups and aralkyl groups. More specifically, there can be mentioned alkyl groups, such as methyl, ethyl, n-propyl, isopropyl, n-butyl, isobutyl, sec-butyl, t-butyl, pentyl, hexyl, octyl, 2-ethylhexyl and decyl; cycloalkyl groups, such as cyclopentyl and cyclohexyl; aryl groups, such as phenyl and tolyl; and aralkyl groups, such as benzyl and neophyl.

Examples of the alkoxy groups include methoxy, ethoxy, n-propoxy, isopropoxy, n-butoxy, isobutoxy, sec-butoxy, t-butoxy, pentoxy, hexoxy and octoxy.

Examples of the aryloxy groups include phenoxy.

Examples of the halogen atoms include fluorine, chlorine, bromine and iodine.

Examples of the trialkylsilyl groups include trimethylsilyl, triethylsilyl and triphenylsilyl.

Listed below are examples of the transition metal compounds represented by the formula (I).

Bis(cyclopentadienyl)zirconium dichloride,
Bis(methylcyclopentadienyl)zirconium dichloride,
Bis(ethylcyclopentadienyl)zirconium dichloride,
Bis(n-propylcyclopentadienyl)zirconium dichloride,
Bis(n-butylcyclopentadienyl)zirconium dichloride,
Bis(n-hexylcyclopentadienyl)zirconium dichloride,
Bis(methyl-n-propylcyclopentadienyl)zirconium dichloride,
Bis(methyl-n-butylcyclopentadienyl)zirconium
Bis(dimethyl-n-butylcyclopentadienyl)zirconium dichloride,
Bis(n-butylcyclopentadienyl)zirconium dibromide,
Bis(n-butylcyclopentadienyl)zirconium methoxychloride,
Bis(n-butylcyclopentadienyl)zirconium ethoxychloride,
Bis(n-butylcyclopentadienyl)zirconium butoxychloride
Bis(n-butylcyclopentadienyl)zirconium ethomide,
Bis(n-butylcyclopentadienyl)zirconium methylchloride,
Bis(n-butylcyclopentadienyl)zirconium dimethyl,
Bis(n-butylcyclopentadienyl)zirconium benzylchloride
Bis(n-butylcyclopentadienyl)zirconium dibenzyl,
Bis(n-butylcyclopentadienyl)zirconium phenylchloride, and
Bis(n-butylcyclopentadienyl)zirconium hydride chloride.

In the above examples, the di-substituted cyclopentadienyl rings include 1,2-substituted cyclopentadienyl rings and 1,3-substituted cyclopentadienyl rings. The tri-substituted cyclopentadienyl rings include 1,2,3-substituted cylcopentadienyl rings and 1,2,4-substituted cyclopentadienyl rings. In the present invention, also employable are transition metal compounds wherein zirconium is replaced with titanium or hafnium in the above-exemplified zirconium compounds.

Of the above transition metal compounds, particularly preferable are:
bis(n-propylcyclopentadienyl)zirconium dichloride,
bis(n-butylcyclopentadienyl)zirconium dichloride,
bis(1-methyl-3-n-propylcyclopentadienyl)zirconium dichloride, and
bis(1-methyl-3-n-butylcyclopentadienyl)zirconium dichloride.

The organoaluminum oxy-compound (b) (sometimes referred to as "component (b)" hereinafter) may be a benzene-soluble aluminoxane conventionally known or a benzene-insoluble organoaluminum oxy-compound disclosed in Japanese Patent Laid-Open Publication No. 276807/1990.

The conventionally known aluminoxane can be prepared, for example, by contacting the later-described organoaluminum compound with water such as adsorbed water, water of crystallization, ice or water vapor, or by causing the later-described organoaluminum compound to react with organotin oxide.

The fine particle carrier (c) used in the invention is an inorganic or organic, granulated or articulate solid compound having a particle diameter of 10 to 300 $\mu$m preferably 20 to 200 $\mu$m. As the inorganic carrier, porous inorganic oxide is preferably employed. Examples of such oxides include $SiO_2$, $Al_2O_3$, MgO, $Zr_2$, $TiO_2$, $B_2O_3$, CaO, ZnO, BaO, $ThO_2$ and mixtures thereof such as $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Among them, preferable are those containing $SiO_2$ and/or $Al_2O_3$ as their major component.

The above-mentioned inorganic oxides may contain small amounts of carbonate component, sulfate component, nitrate component and oxide component, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

The properties of the fine particle carrier (c) vary depending on the type of the carrier and the process for the preparation thereof, but preferably used is a fine particle carrier having a specific surface area of 50 to 1,000 $m^2/g$, preferably 100 to 700 $m^2/g$, and a pore volume of 0.3 to 2.5 $cm^3/g$. The fine particle carrier may be used after calcined at a temperature of 100 to 1,000° C., preferably 150 to 700° C., if desired.

Also employable as the fine particle carrier is an organic, granular or particulate solid compound having a particle diameter of 10 to 300 μm. For example, (co)polymers produced mainly from α-olefins of 2 to 14 carbon atoms such as ethylene, propylene, 1-butene and 4-methyl-1-pentene or (co)polymers produced mainly from vinylcyclohexane or styrene are employable.

The olefin polymerization catalyst used for preparing the ethylene/α-olefin copolymer is formed from the component (a), the component (b) and the component (c). In addition thereto, an organoaluminum compound (d) may be used, if necessary.

The organoaluminum compound (d) (sometimes referred to as "component (d)" hereinafter) is, for example, a compound represented by the following formula (II):

$$R^1_n AlX_{3-n} \quad (II)$$

wherein $R^1$ is a hydrocarbon group of 1 to 12 carbon atoms, X is a halogen atom or a hydrogen atom, and n is 1 to 3.

In the formula (II), $R^1$ is a hydrocarbon group of 1 to 12 carbon atoms, e.g., an alkyl group, a cycloalkyl group or an aryl group. Particular examples of those groups include methyl, ethyl, n-propyl, isopropyl, isobutyl, pentyl, hexyl, octyl, cyclopentyl, cyclohexyl, phenyl and tolyl.

Examples of such organoaluminum compounds include:

trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum; dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound (d) is a compound represented by the following formula (III):

$$R^1_n AlY_{3-n} \quad (III)$$

wherein $R^1$ is the same hydrocarbon as described for $R^1$ in the formula (II); Y is $-OR^2$ group, $-OSiR^3_3$ group, $-OAlR^4_2$ group, $-NR^5_2$ group, $-SiR^6_3$ group or $-N(R) AlR^8_2$ group; n is 1 to 2; $R^2$, $R^3$, $R^4$ and $R^8$ are each methyl, ethyl, isopropyl, isobutyl, cyclohexyl, phenyl or the like; $R^5$ is hydrogen, methyl, ethyl, isoprozyl, phenyl, trimethylsilyl or the like; and $R^6$ and $R^7$ are each methyl, ethyl or the like.

Of such organoaluminum compounds, preferable are compounds of the formula $R^1_n Al(OAlR^4_2)_{3-n}$, e.g., $Et_2AlOAlEt_2$ and $(iso-Bu)_2AlOAl(iso-Bu)_2$.

Of the organoaluminum compounds represented by the formulas (II) and (III), preferable are compounds of the formula $R^1_3Al$, and particularly preferable are compounds of the same formula wherein $R^1$ is an isoalkyl group.

In the preparation of the ethylene/α-olefin copolymer, the catalyst prepared by contacting the component (a), the component (b), the fine particle carrier (c), and if necessary, the component (d) is employed.

The contact of the above components is carried out in an inert hydrocarbon solvent. Examples of the inert hydrocarbon solvents used for preparing the catalyst include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures of these hydrocarbons.

The catalyst used for preparing the ethylene/α-olefin copolymer may be a prepolymerized catalyst obtained by prepolymerizing an olefin in the presence of the component (a), the component (b), the fine particle carrier (c), and if necessary, the component (d). The prepolymerization can be carried out by introducing an olefin into an inert hydrocarbon solvent in the presence of the component (a) the component (b), the fine particle carrier (c), and if necessary, the component (d).

Examples of the olefins used in the prepolymerization include ethylene and the same α-olefins of 3 to 20 carbon atoms as described above. Of these, particularly preferable is ethylene of a combination of ethylene and an α-olefin, which is used in the polymerization.

The prepolymerization can be carried out by any of batchwise and continuous processes, and it can be carried out under reduced pressure, atmospheric pressure or application of pressure. In the prepolymerization, it is desired that a prepolymer having an intrinsic viscosity [η], as measured in decalin at 135° C., of 0.2 to 7 dl/g, preferably 0.5 to 5 dl/g, is produced by allowing hydrogen to coexist in the system.

The ethylene/α-olefin copolymer is obtained by copolymerizing ethylene and the same α-olefin of 3 to 2 carbon atoms as described above in a gas phase in the presence of the olefin polymerization catalyst or the prepolymerized catalyst.

In the polymerization, the olefin polymerization catalyst or the prepolymerized catalyst is desirably used in such an amount that the concentration of the transition metal atom in the polymerization reaction system is usually $10^{-8}$ to $10^{-3}$ g·atom/liter, preferably $10^{-7}$ to $10^{-4}$ g·atom/liter.

In the polymerization, an organoaluminum oxy-compound similar to the component (b) and/or the organoaluminum compound (d) may be added. In this case, the atomic ratio of aluminum atom (Al) derived from the organoaluminum oxy-compound and the organoaluminum compound to the transition metal atom (m) derived from the transition metal compound (a), Al/M, is in the range of 5 to 300, preferably 10 to 200, more preferably 15 to 150.

The polymerization temperature is in the range of usually 0 to 120° C., preferably 20 to 100° C.

The polymerization pressure is n the range or usually atmospheric pressure to 100 kg/cm², preferably 2 to 50 kg/cm². The polymerization can be carried out by any of batchwise, semi-continuous and continuous processes.

At this time, the partial pressure of the monomers is desirably in the range of 8 to 41 kg/cm², preferably 10 to 28 kg/cm². Moreover, the partial pressure of the monomer is desirably 40 to 90% of total pressure, preferably 50 to 80%.

Adopting the aforementioned conditions, catalytic activity is increased and the size of polymer particle in the fluidizing bed is enlarged, thereby reducing the formation of fine particulate polymers and the amount of ungrown catalyst particles. Accordingly, fouling and sheeting in the reactor are prevented. Moreover, invasion of fine particulate polymers and/or catalyst into the circular gas-line is prevented, thereby preventing the choking of circular gas-line, heat-exchanger, gas dispersing plate and the like.

Furthermore, polymer components having high conductivity are produced in large amount, thereby preventing the generation of static electricity. Still more, flowability of the polymer particles in the fludizing bed is improved, and thereby preventing the sheeting and the formation of bulky polymer.

Under such conditions as described above, the ethylene/α-copolymer according to the present invention can be prepared by single stage vapor phase polymerization.

Accordingly, the preferred process for preparing the ethylene/α-olefin copolymer of the present invention is the single stage vapor phase polymerization using the aforementioned prepolymerized catalyst.

Further, the polymerization may be conducted in two or more stages under different reaction conditions.

To the ethylene/α-olefin copolymer of the invention, various additives, such as weathering stabilizer, heat stabilizer, antistatic agent, anti-slip agent, anti-blocking agent, anti-fogging agent, lubricant, pigment, dye, nucleating agent, plasticizer, anti-aging agent, hydrochloric acid absorbent and antioxidant, may be added within limits not prejudicial to the object of the invention.

The ethylene/α-olefin copolymer or the invention can be used without any specific limitation in fields where ethylene copolymers have been conventionally used, and it can be particularly suitably used for films such as cast film and inflation film or sheets such as extrusion sheet.

For producing films or sheets from the ethylene/α-olefin copolymer of the invention, conventional methods and conditions can be adopted.

In the cast film obtained from the ethylene/α-olefin copolymer of the invention, it is desired that the film impact strength (FIS (J/m)) and the density (d (g/cm$^3$)) satisfy the relation $$log(FIS) > (-50.17 \times d) + 47.55.$$

The cast film obtained from the ethylene/α-olefin copolymer of the invention is excellent in not only optical properties such as haze and gloss but also in mechanical strength such as elastic modulus, elongation, impact strength and tear strength. Besides, the cast film has excellent blocking resistance and a low coefficient of friction.

EFFECT OF THE INVENTION

The ethylene/α-olefin copolymer of the invention shows excellent moldability, and from this copolymer, molded products having excellent mechanical strength and transparency can be obtained.

When the ethylene/α-olefin copolymer of the invention is molded into a film such as a cast film, the resulting film shows excellent transparency and mechanical strength.

Described below are definitions of property values, measurement of property values and a molding method used herein.

(1) Granulation of Ethylene Copolymer 100 parts by weight of a powdery ethylene copolymer obtained by a gas phase polymerization process is blended with 0.05 part by weight of tri(2,4-di-t-butylphenyl) phosphate as a secondary antioxidant, 0.1 part by weight of n-octadecyl-3-(4'-hydroxy-3',5'-di-t-butylphenyl)propionate as a heat stabilizer and 0.05 part by weight of calcium stearate as a hydrochloric acid absorbent. Then, the blend is melt extruded by a twin-screw conical-tapered extruder (manufactured by Harquenton at a preset temperature of 180° C., to prepare granular pellets.

(2) Density

Strands obtained in the measurement of melt flow rate at 190° C. under a load of 2.16 kg are heat treated at 120° C. for 1 hour and slowly cooled to room temperature over a period of 1 hour. Then, the density is measured by a gradient density tube.

(3) Composition of Copolymer

Composition of a copolymer is determined by $^{13}$C-NMR. That is, a $^{13}$C-NMR spectrum of a sample obtained by homogeneously dissolving about 200 mg of a copolymer powder in 1 ml of hexachlorobutadiene in a sample tube having a diameter of 10 mm is measured under the measuring conditions of a measuring temperature of 120° C., a measuring frequency of 25.05 MHz, a spectrum width of 1,500 Hz, a pulse repetition time of 4.2 sec and a pulse width of 6 μsec.

(4) Melt Flow Rate (MFR)

The melt flow rate is measured using granular pellets of a copolymer in accordance with ASTM D 1238-65T under the conditions of a temperature of 190° C. and a load of 2.16 kg.

(5) Measurement of Temperature ($Tm_1$, Tm) at Peak Position by DSC

An apparatus of DSC-7 model manufactured by Perkin Elmer Co. was used. The temperatures ($Tm_1$, Tm) at the positions of an endotherm curve were found from an endotherm curve which is obtained by heating a sample of about 5 mg up to 200° C. at a rate of 10° C./min in an aluminum pan, maintaining the sample at 200° C. for 5 minutes, cooling it to room temperature at a rate of 10° C./min and heating it at a rate of 10° C./min.

(6) Quantity Fraction (W) of n-Decane-soluble Component

The quantity fraction (W) of a n-decane-soluble component is measured in the following manner. About 3 g of a copolymer is added to 450 ml of n-decane, dissolved therein at 145° C. and cooled to 23° C. The n-decane-insoluble portion is removed by filtration, and the n-decane-soluble portion is recovered from the filtrate.

The quantity fraction (W) of a n-decane-soluble component is defined by the following formula:

*W* (%)=Weight of n-decane-soluble portion/Total weight of n-decane-insoluble and n-decane-soluble portions×100

A copolymer having a small quantity fraction of soluble component has a narrow composition distribution.

(7) Melt Tension (MT)

The melt tension is determined by measuring a stress given when a molten polymer is stretched at a constant rate. That is, granular pellets of a copolymer are used as a sample to be measured, and the measurement is carried out using a MT measuring machine (manufacture by Toyo Seiki Seisakusho) under the conditions of a resin temperature of 190° C., an extrusion speed of 15 mm/min, a take-up rate of 10 to 20 m/min, a nozzle diameter of 2.09 mm and a nozzle length of 8 mm.

(8) Flow Index (FI)

The flow index is determined by extruding a resin through a capillary with varying a shear rate and finding a shear rate corresponding to the prescribed stress. That is, using the same sample as in the measurement of MT, the flow index is measured by a capillary flow tester (manufactured by Toyo Seiki Seisakusho K.K.) under the conditions of a resin temperature of 190° C. and a shear stress of about $5 \times 10^{-4}$ to $3 \times 10^{-6}$ dyne/cm$^2$.

In this measurement, the diameter of a nozzle (capillary) is varied according to MFR (g/10 min) of the resin, as described below.

MFR>20: 0.5 mm

20≧MFR>3: 1.0 mm

3≧MFR>0.8; 2.0 mm 0.8≧MFR: 3.0 mm

(9) Temperature Rising Elution Fractionation Test (TREF)

A sample solution was introduced into a column at 140° C/, then cooled to 25° C. at a cooling rate of 10° C./hr, and heated at a heating rate of 15° C./hr to the temperature at which the amount of eluate is not substantially increased. During this process, a component continuously eluted at a constant flow rate of 1.0 ml/min was detected by the online system, the detector of which is Magna 550 type FTIR (Nicolet Co.)

In this test, a column of 2.14 cm (diameter)×15 cm was used, glass beads 100 $\mu$m in diameter were used as a filler, and orthochlorobenzene was used as a solvent. The concentration of the sample solution was 200 mg/40 ml-orthochlorobenzene, and the quantity of the sample solution was 7.5 ml.

(10) Production of Film

A film having a thickness of 40 $\mu$m was produced by cast molding using a single-screw extruder (diameter: 30 mm, L/D: 25) under the conditions of a lip width of 0.7 mm, a processing temperature of 210° C., an extrusion quantity of about 22 g, a roll temperature of 40° C. and a take-up rate of 2.4 m/min.

(11) Evaluation of Film Properties (a) Haze

The haze was measured in accordance with ASM D 1003-61.

(b) Gloss

The gloss was measured in accordance with JIS Z 8741.

(c) Film Impact Strength (FIS)

The film impact strength was measured by a pendulum type film impact tester manufactured by Toyo Seiki Seisakusho.

(d) Complete Heat-sealing Temperature

Heat sealing was carried out using a heat sealer manufactured by Tester Industry. That is, a film was cut to have a size of about 120 mm×120 mm (a set of two sheets). Two of the films thus cut were heat sealed at side with a sealing width of 5 mm under a sealing press of 2 kg/cm$^2$ for a sealing period of 1 second. The press temperature of the sealing bar was varied by 5° C., and at each temperature the films were heat sealed.

The films thus heat sealed were cut perpendicularly to the heat sealed portion to give a specimen of 15 mm (width)× 100 mm. The two sides on the side opposite to the heat sealed portion of the specimen were chucked by an air chuck of an Instron type universal tester, and a tensile test was carried out under the conditions of a chuck distance of 15 mm and a pulling rate of 300 mm/min. The lowest temperature at which the heat sealed portion was not separated and a part of the substrate was broken was regarded as the complete heat-sealing temperature.

(e) Elmendorf Tear Strength

The Elmendorf tear strength was measured in accordance with JIS Z 1702 using an Elmendorf tear tester manufactured by Toyo Seiki Seisakusho. A notch was given in each of the film take-up direction (MD) and the direction (TD) perpendicular to the film take-up direction.

(f) Elastic Modulus

From the film, a dumbbell specimen having a size based on JIS K 6713 was punched out. The specimen was punched out in each of the film take-up direction (MD) and the direction (TD) perpendicular to the film take-up direction.

The specimen was chucked by an air chuck of an Instron type universal tester, and a tensile test was carried out under the conditions of a chuck distance of 86 mm and a pulling rate of 200 mm/min. A tilt against the displacement of the initial stress was regarded as the elastic modulus.

(g) Blocking Force

An inflation film having a size of 10 cm×20 cm was sandwiched between two sheets of typing paper, then further sandwiched between two glass plates, and thereto was applied a load of 10 kg in an air bath at 50° C. for 24 hours. Then, the film was separated from the typing paper by means of an open-type tool at a rate of 200 mm/min. A load applied to separate the film was taken as A (g), and the blocking force (F (g/cm)) was calculated by the equation:

$$F=A/\text{width of specimen.}$$

EXAMPLE

The present invention will be further described with reference to the following examples, but it should be construed that the invention is in no way limited to those examples.

Preparation Example 1

Preparation of Ethylene/α-olefin Copolymer [A]

Preparation of Catalyst

Silica of 10 kg having been dried at 250° C. for 10 hours was suspended in 154 liters of toluene, and the resulting suspension was cooled to 0° C. Then, to the suspension was dropwise added 57.5 liters of a toluene solution of methylaluminoxane (Al: 1.33 ml/liter) over period of 1 hour. During the addition, the temperature of the system was maintained at 0° C. Subsequently, the reaction was conducted at 0° C. for 30 minutes. Then, the temperature of the system was raised to 95° C., over a period of time 1.5 hours, and at this temperature the reaction was conducted for 20 hours. Thereafter, the system was cooled to 60° C., and the supernatant liquid was removed by decantation. The resulting solid component was washed twice with toluene and resuspended in 100 liters of toluene. To the system, 16.8 liters of a toluene solution of bis(1-methyl-3-n-butylcyclopentadienyl)zirconium dichloride (Zr: 27.0 mmol/l) was dropwise added at 80° C. over a period or 30 minutes. The reaction was further conducted at 80° C. for 2 hours. Then, the supernatant liquid was removed, and the remainder was washed twice with hexane to obtain a solid catalyst containing 3.5 mg of zirconium per 1 g of the catalyst.

Preparation of Prepolymerized Catalyst

To 87 liters of hexane containing 2.5 mol of triisobutylaluminum, 870 g of the solid catalyst obtained above and 260 g of 1-hexene were added, and the prepolymerization of ethylene was performed at 35° C. for 5 hours to obtain a prepolymerized catalyst containing 10 g of polyethylene as a prepolymer per 1 g of the solid catalyst.

Polymerization

In a continuous type fluidized bed gas phase polymerization apparatus, copolymerization of ethylene and 1-hexene was carried out at the total pressure of 20 kg/cm$^2$-G and a polymerization temperature of 80° C. To the system were continuously fed the prepolymerized catalyst prepared above at a feed rate of 0.33 mmol/hr in terms of zirconium atom and triisobutylaluminum at a feed rate of 10 mmol/hr. Further, to the system were continuously fed ethylene, 1-hexene, hydrogen and nitrogen to maintain gas composition constant during the polymerization (gas composition: 1-hexene/ethylene=0.02, hydrogen/ethylene 4.6×10$^{-4}$, concentration of ethylene=70%)

The yield of the ethylene/α-olefin copolymer (A-1) was 60 kg/hr, and this copolymer had a density of 0.926 g/cm$^3$ and MFR of 4.2 g/10 min. The temperature at the position of the maximum peak of an endotherm curve of the copolymer measured by DSO was 117.2° C., the temperature at the position of the peak on the lowest temperature side was 106.7° C., and the quantity fraction of the decane-soluble component at room temperature was 0.13 part by weight.

Example 1

The ethylene/α-olefin copolymer (A-1) was melt kneaded and pelletized. The resulting pellets were subjected to cast molding to produce a film having a thickness of 40 μm. The properties of the copolymer and the film are set forth in Tables 1 and 2.

Examples 2 to 6

Ethylene/α-olefin copolymers (A-2) to (A-6) were obtained in the same manner as in the preparation example except that the gas composition was varied so that the resulting ethylene/α-olefin copolymers (A-2) to (A-6) have densities and MFR shown in Table 1. In the preparation of the ethylene/α-olefin copolymer (A-4), however, the polymerization temperature was varied to 70° C.

The ethylene/α-olefin copolymers (A-2) to (A-6) were each melt kneaded and pelletized. The resulting pellets were subjected to cast molding to produce films each having a thickness of 40 μm. The properties of the copolymers and the films are set forth in Tables 1 and 2.

TABLE 2

|  | Haze % | Gloss % | Film impact (0.5" Head) (KJ/m) | Value of Formula (7) *7 | Complete heat-sealing temperature (° C.) |
|---|---|---|---|---|---|
| Example 1 | 4.0 | 105 | 15.6 | 12.3 | 125 |
| Example 2 | 3.6 | 102 | 25.4 | 22.1 | 120 |
| Example 3 | 2.6 | 105 | 70.0 | 44.1 | 115 |
| Example 4 | 0.9 | 109 | NB * | 157.1 | 105 |
| Example 5 | 2.9 | 105 | 27.3 | 27.5 | 120 |
| Example 6 | 2.6 | 106 | 27.1 | 24.8 | 120 |

|  | Elmendorf tear strength (N/cm) | | Elastic modulus (MPa) | | Elongation (%) | | Blocking Force (50° C., 10 kg, 24 hr) |
|---|---|---|---|---|---|---|---|
|  | MD | TD | MD | TD | MD | TD | (kg/m) |
| Example 1 | 780 | 1180 | 230 | 230 | 670 | 770 | 0.11 |
| Example 2 | 1030 | 1420 | 180 | 180 | 660 | 740 | 0.25 |
| Example 3 | 1370 | 1760 | 140 | 140 | 620 | 650 | 0.40 |
| Example 4 | 4700 | 6620 | 100 | 100 | 640 | 690 | 3.0 |
| Example 5 | 960 | 1350 | 180 | 180 | 600 | 730 | 0.20 |
| Example 6 | 840 | 1270 | 190 | 190 | 550 | 700 | 0.20 |

* NB: not broken
*7 Formula (7): $(-50.17 \times d) + 47.55$

TABLE 1

| Ethylene/α-olefin copolymer | Comonomer | | Density (g/cm$^3$) | MFR g/10 min. | MT g | Value of Formula (1) *1 |
| | Kind | Content (mol %) | | | | |
|---|---|---|---|---|---|---|
| A-1 | 1-hexene | 2.6 | 0.926 | 4.2 | 0.42 | 0.66 |
| A-2 | 1-hexene | 3.0 | 0.921 | 4.0 | 0.44 | 0.69 |
| A-3 | 1-hexene | 4.1 | 0.915 | 4.0 | 0.43 | 0.69 |
| A-4 | 1-hexene | 5.3 | 0.904 | 4.3 | 0.40 | 0.65 |
| A-5 | 1-hexene | 3.0 | 0.919 | 3.1 | 0.63 | 0.85 |
| A-6 | 1-hexene | 2.9 | 0.920 | 2.1 | 0.95 | 1.18 |

| Ethylene/α-olefin copolymer | FI S$^{-1}$ | Value of Formula (2) *2 | Quantity fraction of decane-soluble component (wt %) | Value of Formula (3) *3 |
|---|---|---|---|---|
| A-1 | 260 | 630 | 0.13 | 0.90 |
| A-2 | 250 | 600 | 0.25 | 1.43 |
| A-3 | 250 | 600 | 0.50 | 2.52 |
| A-4 | 260 | 645 | 2.10 | 7.36 |
| A-5 | 200 | 465 | 0.22 | 1.72 |
| A-6 | 120 | 315 | 0.19 | 1.56 |

| Ethylene/α-olefin copolymer | $Tm_1$ ° C. | Tm ° C. | Value of Formula (4) *4 | $Tm-Tm_1$ ° C. | Value of Formula (5) *5 | Value of Formula (6) *6 | TREF >100° C. Wt %* |
|---|---|---|---|---|---|---|---|
| A-1 | 106.7 | 117.2 | 122.4 | 10.5 | 20.4 | 2.4 | 5.0 |
| A-2 | 104.7 | 115.0 | 120.4 | 10.3 | 23.4 | 5.4 | 4.8 |
| A-3 | 101.0 | 113.9 | 118.0 | 12.9 | 27.0 | 9.0 | 3.5 |
| A-4 | 90.0 | 110.2 | 113.6 | 20.2 | 33.6 | 15.6 | 1.3 |
| A-5 | 104.6 | 114.9 | 119.6 | 10.3 | 24.6 | 6.6 | 4.5 |
| A-6 | 105.0 | 115.2 | 120.0 | 10.2 | 24.0 | 6.0 | 4.0 |

*1 Formula (1): $2.2 \times MFR^{-0.84}$
*2 Formula (2): $150 \times MFR$
*3 Formula (3): $80 \times \exp(-100(d - 0.88)) + 0.1$
*4 Formula (4): $400 \times d - 248$
*5 Formula (5): $576 - 600d$
*6 Formula (6): $558 - 600d$
*Proportion of the amount of the component which is eluted at a temperature of not lower than 100° C. in the measurement of TREF to the total amount of the eluate.

What is claimed is:

1. An ethylene/α-olefin copolymer which is a copolymer of ethylene and 1-hexene and has the following properties:

(i) the density is in the range of 0.880 to 0.960 g/cm$^3$, (ii) the melt flow rate at 190° C. under a load of 2.16 kg is in the range of 0.1 to 100 g/10 min, (iii) the melt tension (MT (g)) at 190° C. and the melt flow rate (MFR (g/20 min)) satisfy the relation $$MT \leq 2.2 \times MFR^{-0.84},$$

(iv) the quantity fraction (W (% by weight)) of a decane-soluble component of said copolymer at 23° C. and the density (d (g/cm$^3$)) satisfy the relation in the case of MFR≦10 g/10 min:

$$W < 80 \times \exp(-100(d-0.88))+0.1,$$

in the case of MFR≦10 g/10 min:

$$W < 80 \times (MFR-9)^{0.26} \times \exp(-100(d-0.88))+0.1,$$

(v) the temperature (Tm (° C.)) at the position of the maximum peak of an endotherm curve of said copolymer measured by a differential scanning calorimeter and the density (d (g/cm$^3$)) satisfy the relation $$Tm < 400 \times d - 248,$$

(vi) the endotherm curve of said copolymer measured by a differential scanning calorimeter has two or more peaks, and the temperature (Tm$_1$ (° C.)) at the position of the pea on the lowest temperature side, the temperature (Tm (° C.)) at the position of the maximum peak and the density (d (g/cm$^3$)) satisfy the relation $$576-600d > (Tm-Tm_1) > 558-600d,$$

and (vii) a component, which is eluted at a temperature of not lower than 100° C. in a temperature rise elution test (TREF), exists in said copolymer, and the amount of the eluted component is not more than 10% of the total amount of the eluate.

2. A process for preparing an ethylene/α-olefin copolymer, which comprises:

(A) copolymerizing ethylene and 1-hexene by continuous vapor phase polymerization;

(B) copolymerization is conducted in the presence of a prepolymerized catalyst obtained by prepolymerizing ethylene in the presence of
  (a) a transition metal metallocene compound catalyst,
  (b) an organoaluminum oxy-compound,
  (c) a fine particle carrier, and optionally
  (d) an organoaluminum compound;

(C) copolymerization is conducted under such condition that the partial pressure of the sum of the ethylene and 1-hexene is 10 to 28 kg/cm$^2$; and (D) the resulting ethylene/1-hexene copolymer has the following properties:
  (i) the density is in the range of 0.880 to 0.960 g/cm$^3$,
  (ii) the melt flow rate of 190° C. under a load of 2.16 kg is in the range of 0.1 to 100 g/10 min,
  (iii) the melt tension (MT (g)) at 190° C. and the melt flow rate (MFR (g/10 min)) satisfy the relation $$MT \leq 2.2 \times MFR^{-0.84},$$

(iv) the quantity fraction (W (% by weight)) of a decane-soluble component of said copolymer at 23° C. and the density (d (g/cm$^3$)) satisfy the relation in the case of MFR≦10 g/10 min:

$$W < 80 \times \exp(-100(d-0.88))+0.1,$$

in the case of MFR>10 g/10 min:

$$W < 80 \times (MFR-9)^{0.26} \times \exp(-100(d-0.88))+0.1,$$

(v) the temperature (Tm (° C.) at the position of the maximum peak of an endotherm curve of said copolymer measured by a differential scanning calorimeter and the density (d (g/cm$^3$)) satisfy the relation $$Tm < 400 \times d - 248,$$

(vi) the endotherm curve of said copolymer measured by a differential scanning calorimeter has two or more peaks, and the temperature (Tm$_1$(° C.)) at the position of the peak on the lowest temperature side, the temperature (Tm (° C.)) at the position of the maximum peak and the density (d (g/cm$^3$)) satisfy the relation $$576-600d > (Tm-Tm_1) > 558-600d,$$

and (vii) a component, which is eluted at a temperature of not lower than 100° C. in a temperature rise elution test (TREF), exists in said copolymer, and the amount of the eluted component is 0.5 to 8% of the total amount of the eluate.

3. The process as claimed in claim 2, wherein the resulting ethylene/1-hexene copolymer has such properties that the copolymer is capable of being case molded into a film having the following properties:

the film impact strength (FIS (J/m)) and the density (d (g/cm$^3$)) satisfy the relation $$\log(FIS) > (-50.17 \times d) + 47.55.$$

4. The process as claimed in claim 2, wherein the copolymerization is conducted by a single stage vapor phase polymerization.

5. A film which is obtained from the ethylene/1-hexene copolymer produced by the process as claimed in claim 2.

6. A cast film which is obtained by cast molding the ethylene/1-hexene copolymer produced by the process as claimed in claim 2 and has the following properties:

the film impact strength (FIS (J/m)) and the density (d (g/cm$^3$)) satisfy the relation $$\log(FIS > (-50.17 \times d) + 47.55.$$

7. An ethylene/α-olefin copolymer which is prepared by copolymerizing ethylene and 1-hexene in a single stage vapor polymerization in the presence of a prepolymerized catalyst obtained by prepolymerizing ethylene in the presence of (a) a transition metal compound, (b) an aluminoxane compound, (c) a fine solid particle carrier, and (d) a C$_1$–C$_4$ alkylaluminum compound, or a C$_1$–C$_4$ alkylaluminum halide compound, wherein said transition metal compound consists essentially of a single metallocene catalyst of the formula (I):

$$ML_x \qquad (I)$$

M is a transition metal atom selected from the group consisting of zirconium, titanium and hafnium, x is a valence of the transition metal atom M, L is a ligand coordinated to the transition metal atom M, and at least two of the ligands L are each a substituted cyclopentadienyl group having at least one substituent selected from hydrocarbon groups of 3 to 10 carbon atoms, or a substituted cyclopentadienyl group having two or more substituents, wherein at least one substituent is a hydrocarbon group of 3 or 4 carbon atoms, and other substituent is methyl or ethyl, and the ligand L other than the cyclopentadienyl group is a hydrocarbon group of 1 to 12 carbon atoms, an alkoxy group, a halogen atom, or a hydrogen atom, and which consists essentially of a copolymer of ethylene and 4 to 25% by weight of 1-hexene and has the following properties:

(i) the density is in the range of 0.890 to 0.935 g/cm$^3$, (ii) the melt flow rate at 190° C. under a load of 2.16 kg is in the range of 0.5 to 20 g/10 min, (iii) the melt tension (MT (g)) at 190° C. and the melt flow rate (MFR (g/10 min)) satisfy the relation $$MT \leq 2.2 \times MFR^{-0.84},$$

(iv) the quantity fraction (W (% by weight)) of a decane-soluble component of said copolymer at 23° C. and the density (d (g/cm$^3$)) satisfy the relation in the case of MFR≦10 g/10 min;

$$W < 80 \times \exp(-100(d-0.88))+0.1,$$

in the case of MFR>10 g/10 min:

$$W < 80 \times (MFR-9)^{0.26} \times \exp(-100(d-0.88))+0.1,$$

(v) the temperature (Tm (° C.)) at the position of the maximum peak of an endotherm curve of said copolymer measured by a differential scanning calorimeter and the density (d (g/cm$^3$)) satisfy the relation $$Tm < 400 \times d - 248,$$

(vi) the endotherm curve of said copolymer measured by a differential scanning calorimeter has two or more peaks, and the temperature (Tm$_1$ (° C.)) at the position of the peak on the lowest temperature side, the temperature (Tm (° C.)) at the position of the maximum peak and the density (d (g/cm$^3$) satisfy the relation $$576-600d > (Tm-Tm_1) > 558-600d,$$

and (vii) a component, which is eluted at a temperature of not lower than 100° C. in a temperature rise elution test (TREF), exists in said copolymer, and the amount of the eluted component is 1 to 5% by weight of the total amount of the eluate.

8. The ethylene/1-hexene copolymer as claimed in claim 7, in which in the ML$_x$ formula (I) the ligand L other than the cyclopentadienyl group is hydrocarbon group of 1 to 3 carbon atoms or a halogen atom.

9. The ethylene/1-hexene copolymer as claimed in claim 7, in which the transition metal compound in the prepolymerized catalyst is a member selected from the group consisting of bis(n-propyl cyclopentadienyl)zirconium dichloride, bis(n-butylcyclopentadienyl)zirconium dichloride, bis(1-methyl-3-n-propylcyclopentadienyl)zirconium dichloride and bis(1-methyl-3-n-butylcyclopentadienyl)zirconium dichloride.

10. The ethylene/1-hexene copolymer as claimed in claim 7, in which the prepolymerization catalyst contains a C$_1$–C$_4$ alkylaluminum compound.

11. The ethylene/1-hexene copolymer as claimed in claim 7, in which the hexene is present in an amount of about 5.3% by weight and the transition metal compound in the prepolymerized catalyst is bis(1-methyl-3-n-butyl-cyclopentadienyl)zirconium dichloride.

12. The ethylene/1-hexene copolymer as claimed in claim 7, capable of being cast molded into a film having the following properties:

the film impact strength (FIS (J/m) and the density (d (g/cm$^3$)) satisfy the relation $$\log(FIS) > (-50.17 \times d) + 47.55.$$

13. A film which is obtained from the ethylene/1-hexene copolymer as claimed in claim 7.

14. A cast film which is obtained by cast molding the ethylene/1-hexene copolymer as claimed in claim 7, and has the following properties:

the film impact strength (FIS (J/m)) and the density (d(g/cm$^3$)) satisfy the relation $$\log(FIS) > (-50.17 \times d) + 47.55.$$

15. The process for preparing the ethylene/α-olefin copolymer of claim 2 wherein the copolymerizing of ethylene and 1-hexene is carried out in a single stage vapor polymerization in the presence of a prepolymerized catalyst obtained by prepolymerizing ethylene in the presence of (a) a transition metal compound, (b) an aluminoxane compound, (c) a fine solid particle carrier, and (d) a C$_1$–C$_4$ alkylaluminum compound, or a C$_1$–C$_4$ alkylaluminum halide compound, wherein said transition metal compound consists essentially of a single metallocene catalyst of the formula (I):

$$ML_x \quad (I)$$

M is a transition metal atom selected from the group consisting of zirconium, titanium and hafnium, x is a valence of the transition metal M, L is a ligand coordinated to the transition metal atom M, and at least two of the ligands L are each a substituted cyclopentadienyl group having at least one substituent selected from hydrocarbon groups of 3 to 10 carbon atoms, or a substituted cyclopentadienyl group having two or more substituents, wherein at least one substituent is a hydrocarbon group of 3 or 4 carbon atoms, and other substituent is methyl or ethyl, and the ligand L other than the cyclopentadienyl group is a hydrocarbon group of 1 to 12 carbon atoms, an alkoxy group, a halogen atom, or a hydrogen atom.

16. The process of claim 15 wherein the ML$_x$ formula (I) the ligand L other than the cyclopentadienyl group is hydrocarbon group of 1 to 3 carbon atoms or a halogen atom.

17. The process of claim 15 wherein the transition metal compound in the prepolymerized catalyst is a member selected from the group consisting of bis(n-propyl cyclopentadienyl)zirconium dichloride, bis(n-butylcyclopentadienyl)zirconium dichloride, bis(1-methyl-3-n-butylcyclopentadienyl)zirconium dichloride.

18. The process of claim 15 wherein the prepolymerization catalyst contains a $C_1$ to $C_4$ alkylaluminum compound.

19. The process of claim 15, wherein hexene is present in an amount of about 5.3% by weight and the transition metal compound in the prepolymerized catalyst is bis(1-methyl-3-n-butyl-cyclopentadienyl)zirconium dichloride.

* * * * *